US006895646B1

(12) United States Patent
Houg

(10) Patent No.: US 6,895,646 B1
(45) Date of Patent: May 24, 2005

(54) HYDRAULIC PULLER

(76) Inventor: Wen-Cheng Houg, 58, Ma Yuan West St., Taichung (TW)

(*) Notice: Subject to any disclaimer, the term of this patent is extended or adjusted under 35 U.S.C. 154(b) by 0 days.

(21) Appl. No.: 10/684,158

(22) Filed: Oct. 9, 2003

(51) Int. Cl.[7] .................................................. B23P 19/04
(52) U.S. Cl. ............................................ 29/252; 29/261
(58) Field of Search .......................... 29/255, 252, 261, 29/246, 258, 267; 254/93 H, 93 R, 89 H

(56) References Cited

U.S. PATENT DOCUMENTS 5,233,740 A * 8/1993 Chen ........................... 29/252
5,419,027 A * 5/1995 McPeak et al. ............... 29/252
6,266,861 B1 * 7/2001 Chen ........................... 29/261
6,581,261 B1 * 6/2003 Chen ........................... 29/252

* cited by examiner

*Primary Examiner*—Lee D. Wilson
(74) *Attorney, Agent, or Firm*—Alan D. Kamrath; Nikolai & Mersereau, P.A.

(57) ABSTRACT

A hydraulic puller includes a hydraulic cylinder, a pump, an oil tank, and a clamping device. The clamping device includes a support seat, a plurality of pivot plates, a plurality of connecting plates, a plurality of claws, and an operation plate. Thus, the operation plate can be rotated by the user's hand to rotate and lift the clamping device so as to control operation of each of the claws, thereby facilitating the user operating the hydraulic puller.

19 Claims, 12 Drawing Sheets

HYDRAULIC PULLER

BACKGROUND OF THE INVENTION

1. Field of the Invention

The present invention relates to a hydraulic puller, and more particularly to a hydraulic puller that can be used to clamp the wheel rim and the wheel axle easily and rapidly, thereby facilitating the user detaching the wheel rim from the wheel axle.

2. Description of the Related Art

A conventional hydraulic puller can be used to detach the wheel rim from the wheel axle and comprises a hydraulic cylinder having a lower section formed with an outer thread, and a clamping device including a support seat formed with an inner thread screwed on the outer thread of the hydraulic cylinder, and a plurality of claws each pivotally mounted on the support seat and each having a distal end formed with a hook hooked on the wheel rim. Thus, the support seat can be rotated by the user's hand to rotate and lift the clamping device to control operation of each of the claws. The conventional hydraulic puller also comprises an oil control device to control the oil path.

However, the support seat cannot be rotated easily and conveniently, thereby causing inconvenience to the user when operating the conventional hydraulic puller. In addition, the oil control device is mounted on an outside of the conventional hydraulic puller, so that the user easily misadjusts the oil path of the oil control device, thereby wearing the conventional hydraulic puller. Further, the oil path of the oil control device is operated slowly, so that the wheel rim and the wheel axle cannot be positioned easily and rapidly, thereby decreasing the working efficiency of the conventional hydraulic puller.

SUMMARY OF THE INVENTION

The primary objective of the present invention is to provide a hydraulic puller, wherein the operation shaft and the urging unit are moved to press the wheel axle rapidly by control of the oil control device, so that the hydraulic puller can be used to clamp the wheel rim and the wheel axle easily and rapidly, thereby facilitating the user detaching the wheel rim from the wheel axle.

Another objective of the present invention is to provide a hydraulic puller, wherein the operation handle of the pump has an adjustable length, so as to fit users of different statures, thereby enhancing the versatility of the hydraulic puller.

A further objective of the present invention is to provide a hydraulic puller, wherein the operation plate can be rotated by the user's hand to rotate and lift the clamping device so as to control operation of each of the claws, thereby facilitating the user operating the hydraulic puller.

A further objective of the present invention is to provide a hydraulic puller, wherein the oil control device is built in the inside of the hydraulic puller, thereby preventing the user from misadjusting the oil path so as to protect the hydraulic puller.

In accordance with the present invention, there is provided a hydraulic puller, comprising a hydraulic cylinder, a pump, an oil tank, and a clamping device, wherein:

the hydraulic cylinder has a lower section formed with an outer thread;

the clamping device includes:

a support seat mounted on the hydraulic cylinder and formed with an inner thread screwed on the outer thread of the hydraulic cylinder;

a plurality of pivot plates each mounted on an outer wall of the support seat;

a plurality of connecting plates each having a first end pivotally mounted on a respective one of the pivot plates;

a plurality of claws each having a mediate portion pivotally mounted on a second end of a respective one of the connecting plates and each having a distal end formed with a hook; and an operation plate secured on the support seat.

Further benefits and advantages of the present invention will become apparent after a careful reading of the detailed description with appropriate reference to the accompanying drawings.

DETAILED DESCRIPTION OF THE INVENTION

Figure 1:
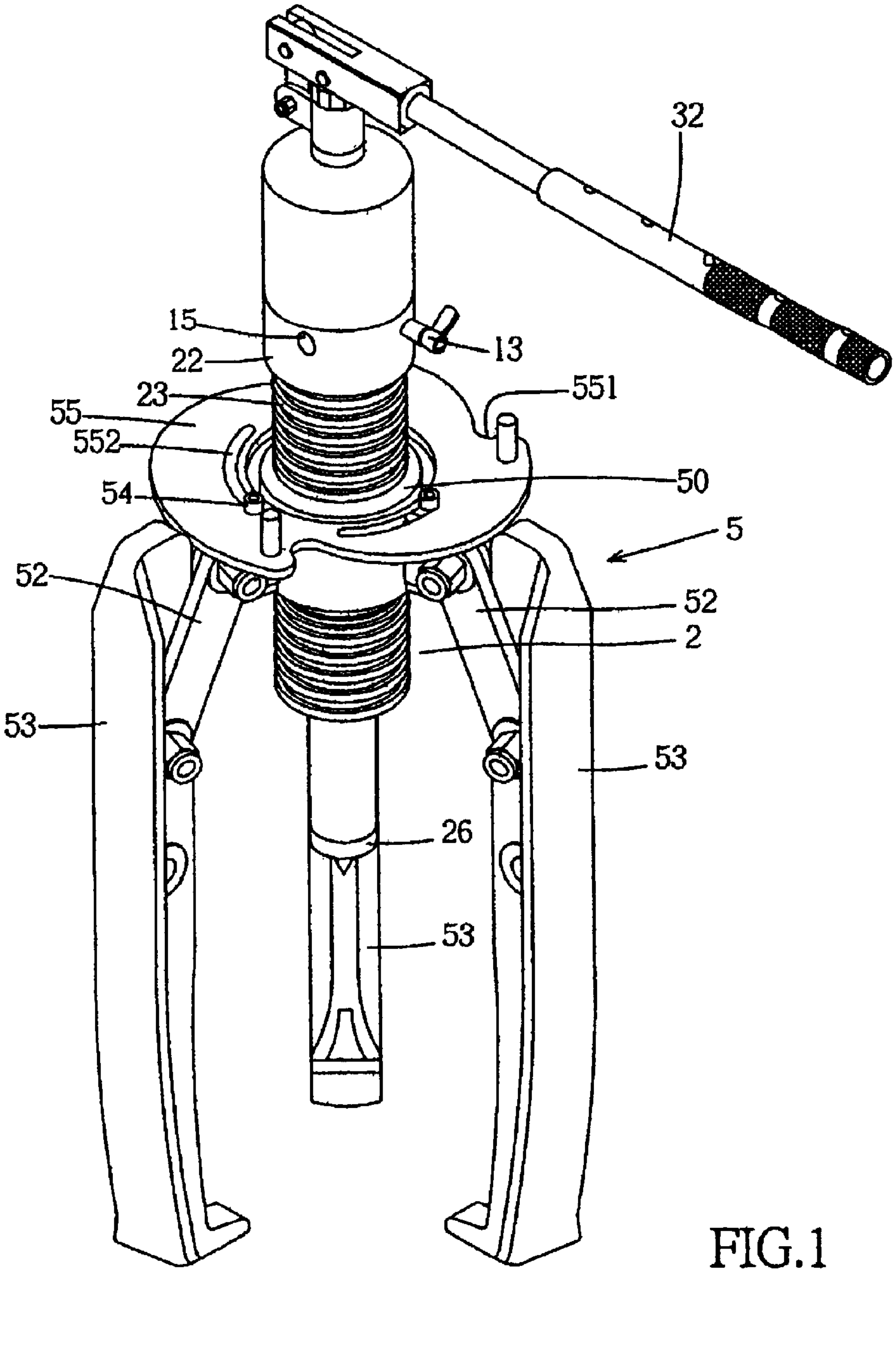
FIG. 1 is a perspective view of a hydraulic puller in accordance with the preferred embodiment of the present invention.
Figure 2:
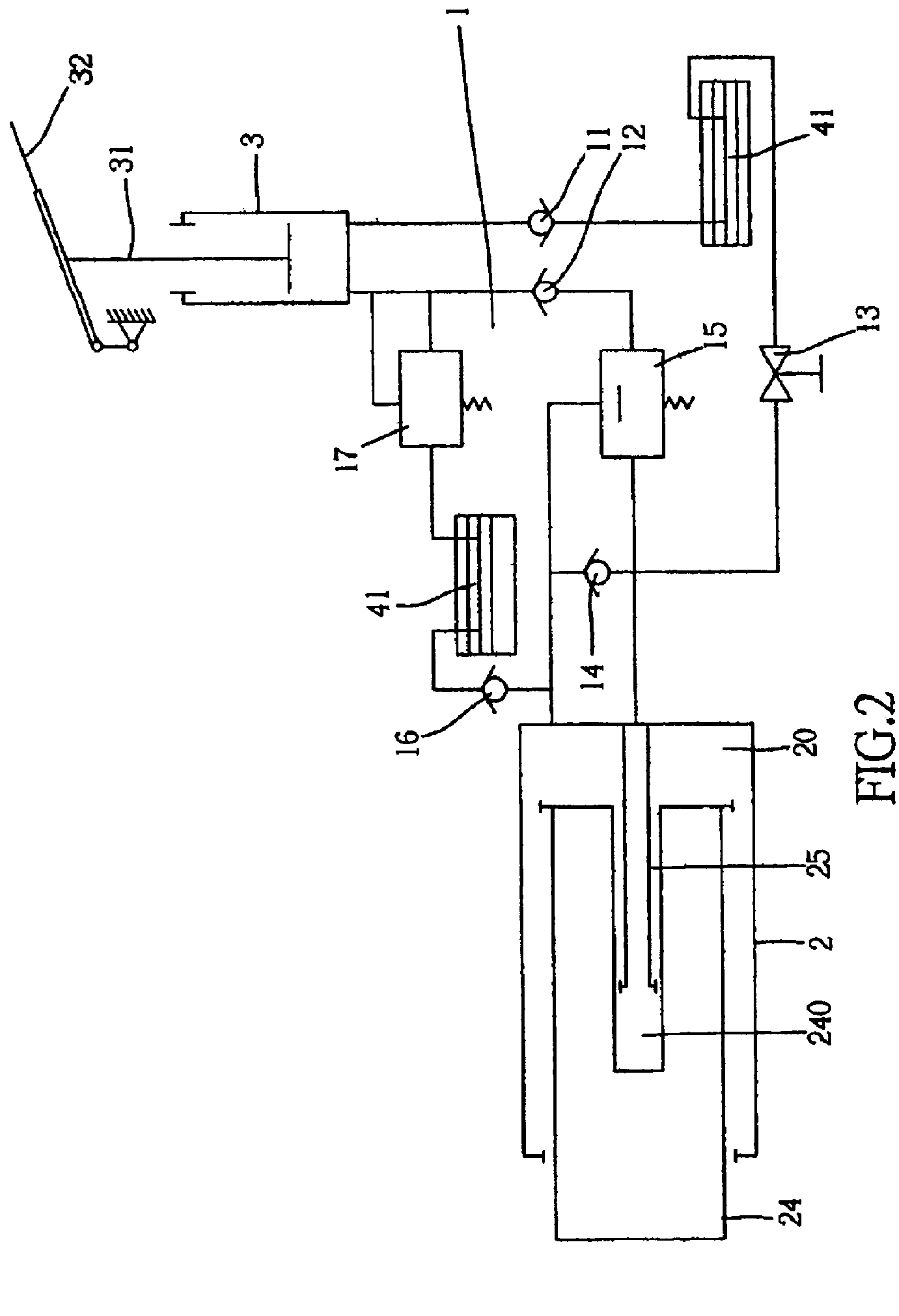
FIG. 2 is a circuit diagram of an oil control device of the hydraulic puller as shown in FIG. 1.

Referring to the drawings and initially to FIGS. 1–7, a hydraulic puller in accordance with the preferred embodiment of the present invention comprises an oil control device 1, a hydraulic cylinder 2, a pump 3, an oil tank 4, and a clamping device 5.

The hydraulic cylinder 2 has an inner wall formed with an oil chamber 20 for receiving an operation shaft 24 and an oil guide tube 25. The operation shaft 24 is movably mounted in the oil chamber 20 of the hydraulic cylinder 2 and has a lower end provided with an urging unit 26. The hydraulic cylinder 2 has an upper section 22 formed with a central hole 228, the operation shaft 24 has an upper end formed with an oil chamber 240, and the oil guide tube 25 has an upper end mounted in the central hole 228 of the upper section 22 of the hydraulic cylinder 2 and a lower end movably mounted in the oil chamber 240 of the operation shaft 24. A spring 242 is mounted on the operation shaft 24 and has a first end secured on a top of the operation shaft 24 and a second end secured on a bottom of the hydraulic cylinder 2.

The hydraulic cylinder 2 has a lower section formed with an outer thread 23. The clamping device 5 includes a support seat 50 mounted on the hydraulic cylinder 2 and formed with an inner thread 500 screwed on the outer thread 23 of the hydraulic cylinder 2.

The clamping device 5 further includes a plurality of pivot plates 51 each mounted on an outer wall of the support seat 50, a plurality of connecting plates 52 each having a first end pivotally mounted on a respective one of the pivot plates 51, and a plurality of claws 53 each having a mediate portion pivotally mounted on a second end of a respective one of the connecting plates 52 and each having a distal end formed with a hook 531.

Figure 7:
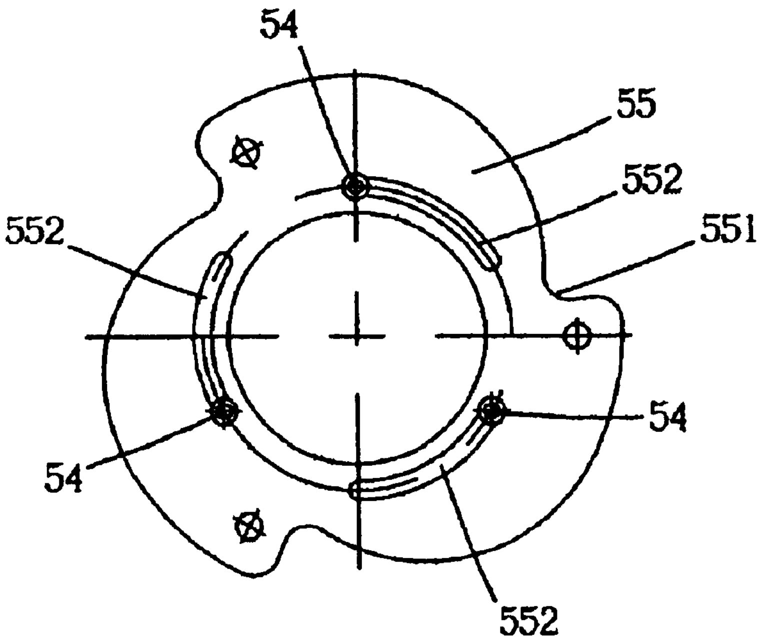
FIG. 7 is a cross-sectional view of the hydraulic puller taken along line 7—7 as shown in FIG. 3.
Figure 7A:
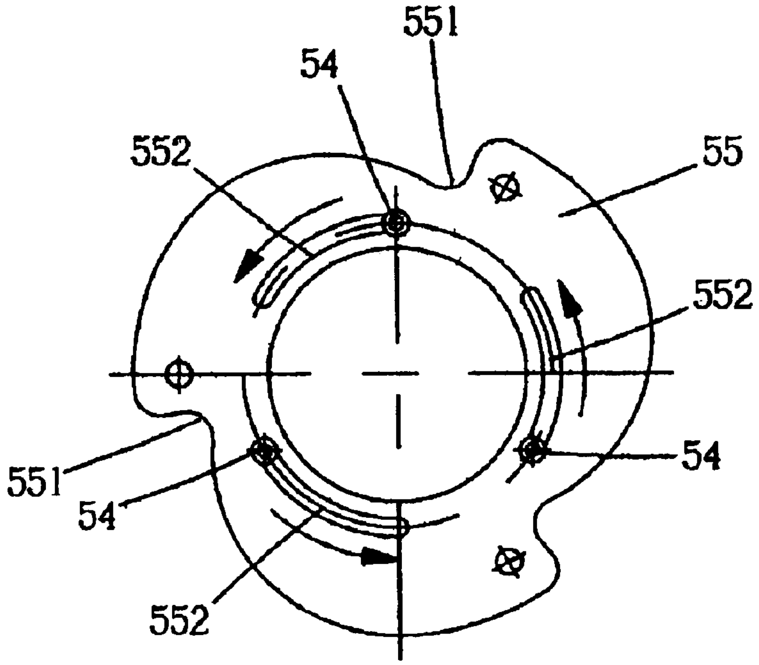
FIG. 7A is a schematic operational view of the hydraulic puller as shown in FIG. 7.

As shown in FIGS. 7 and 7A, the clamping device 5 further includes an operation plate 55 secured on the support seat 50. Each of the pivot plates 51 is formed with a screw bore 511, the operation plate 55 is formed with a plurality of arc-shaped slots 552, and the clamping device 5 further includes a plurality of screw members 54 each extended through a respective one of the arc-shaped slots 552 of the operation plate 55 and each screwed into the screw bore 511 of a respective one of the pivot plates 51, so that the operation plate 55 is secured on the support seat 50. In addition, the operation plate 55 has a periphery formed with a plurality of hook-shaped cutouts 551 to facilitate the user operating the operation plate 55. Thus, the operation plate 55 can be rotated by the user's hand so as to rotate and lift the clamping device 5.

The oil control device 1 includes an oil supply check valve 11, a high pressure check valve 12, an oil return switch 13, a check valve 14, a pressure switch valve 15, a quick oil supply valve 16, and a pressure regulating valve 17.

Figure 3:
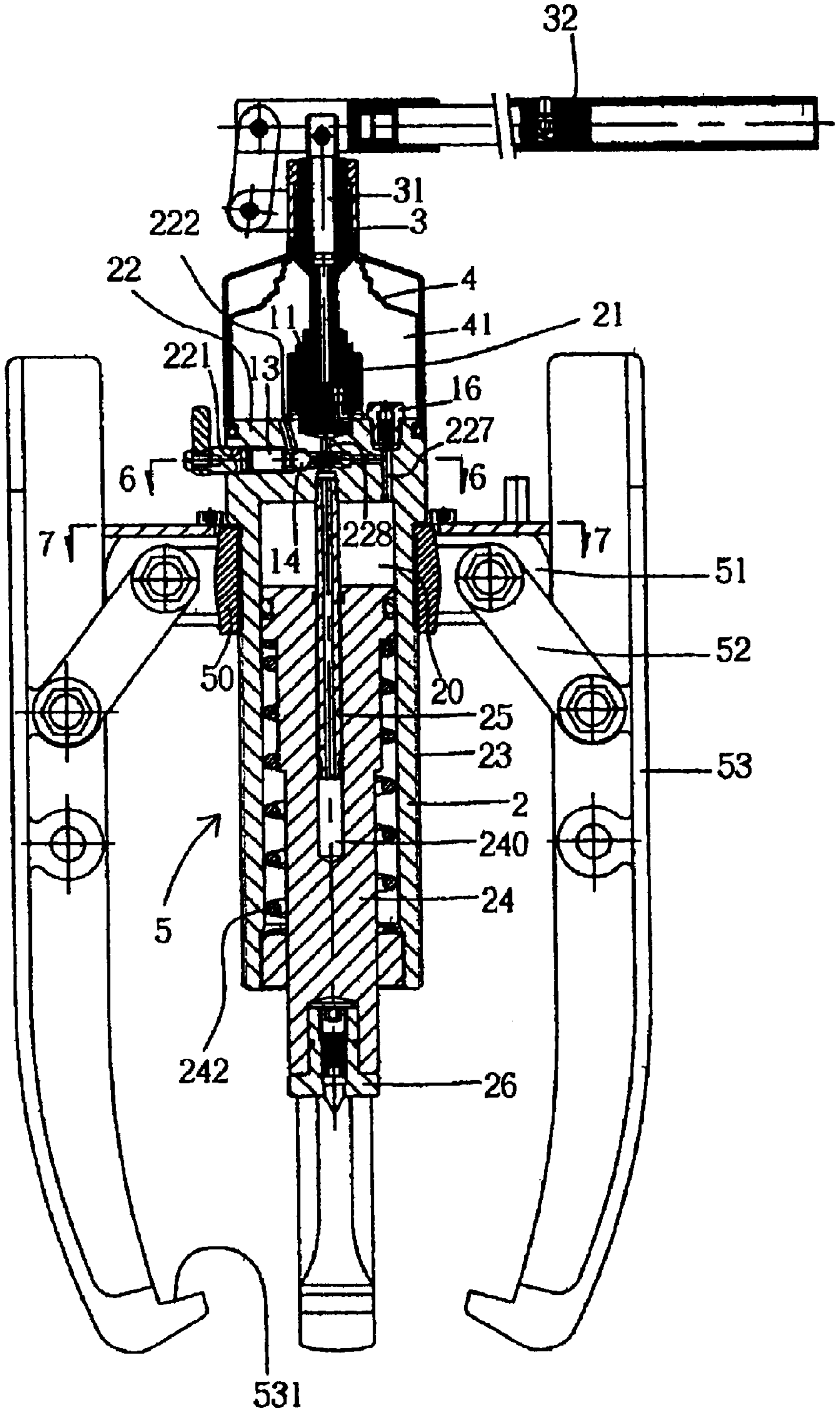
FIG. 3 is a partially plan cross-sectional view of the hydraulic puller as shown in FIG. 1.
Figure 4:
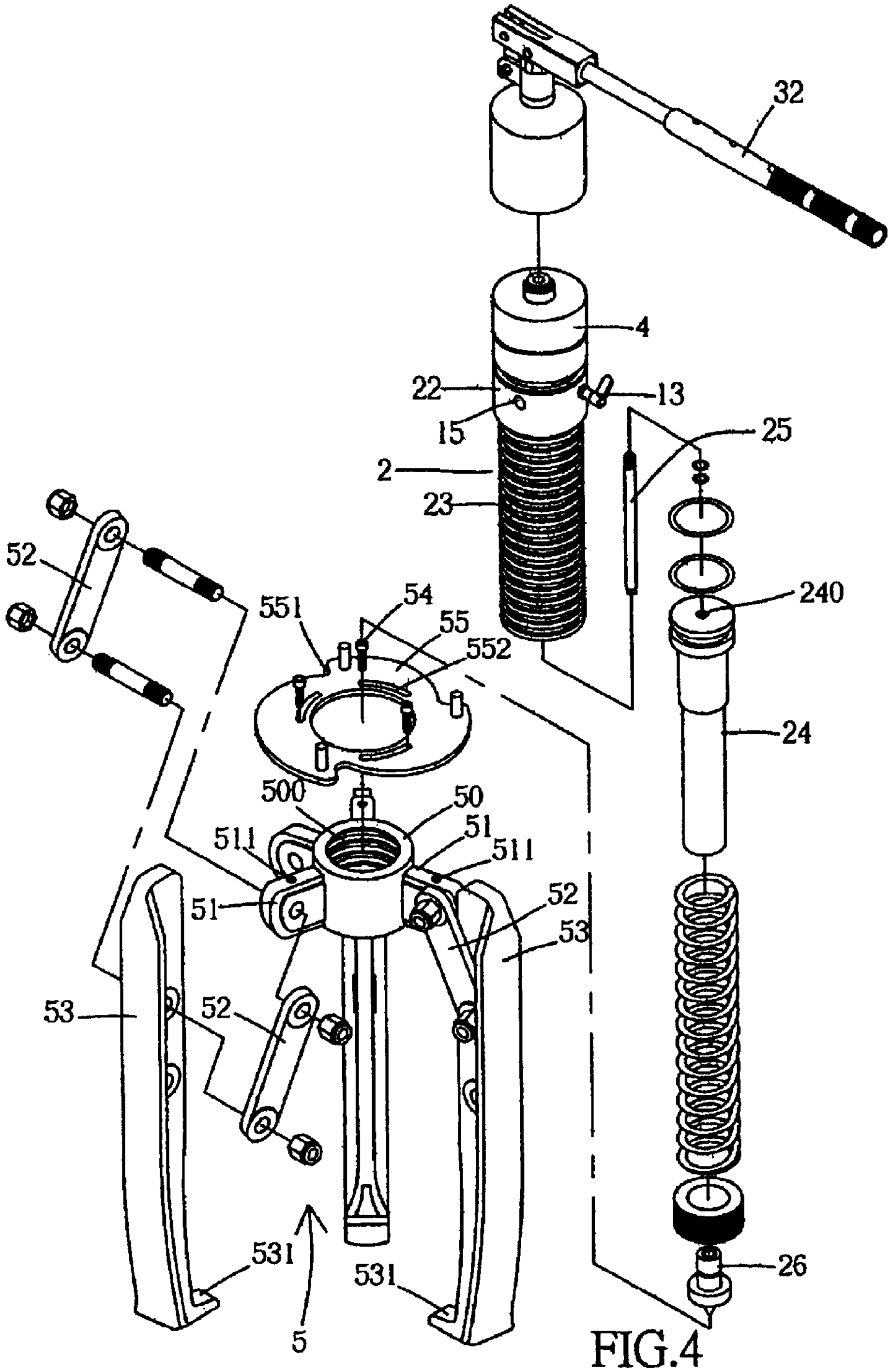
FIG. 4 is an exploded perspective view of the hydraulic puller as shown in FIG. 1.
Figure 5:
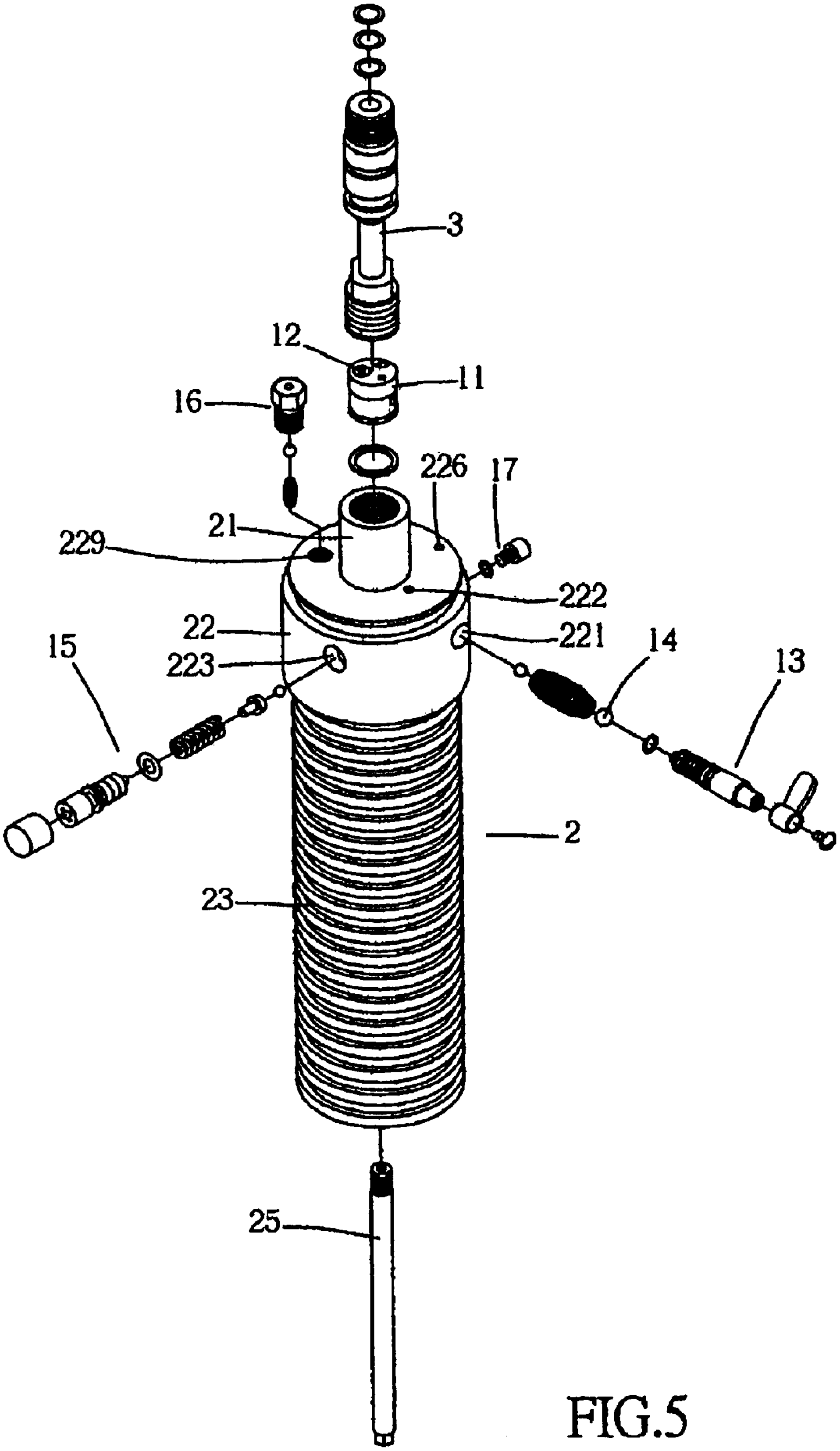
FIG. 5 is a partially exploded perspective view of the hydraulic puller as shown in FIG. 1.

As shown in FIGS. 3 and 5, the oil supply check valve 11 is mounted in a protruding ring 21 of a top of the hydraulic cylinder 2 and is mounted on a lower end of the pump 3 which is mounted in the oil tank 4 which is mounted on the upper section 22 of the hydraulic cylinder 2. Thus, when the piston 31 of the pump 3 is moved outward with the operation handle 32 of the pump 3, the oil supply check valve 11 can introduce the oil contained in the oil chamber 41 of the oil tank 4 into the pump 3. In addition, the oil supply check valve 11 has an oil inlet 111 (see FIG. 10) communicating with the oil chamber 41 of the oil tank 4, and an oil outlet 112 (see FIG. 11) communicating with the oil chamber 20 of the hydraulic cylinder 2 through the central hole 228 of the upper section 22 of the hydraulic cylinder 2.

Figure 8:
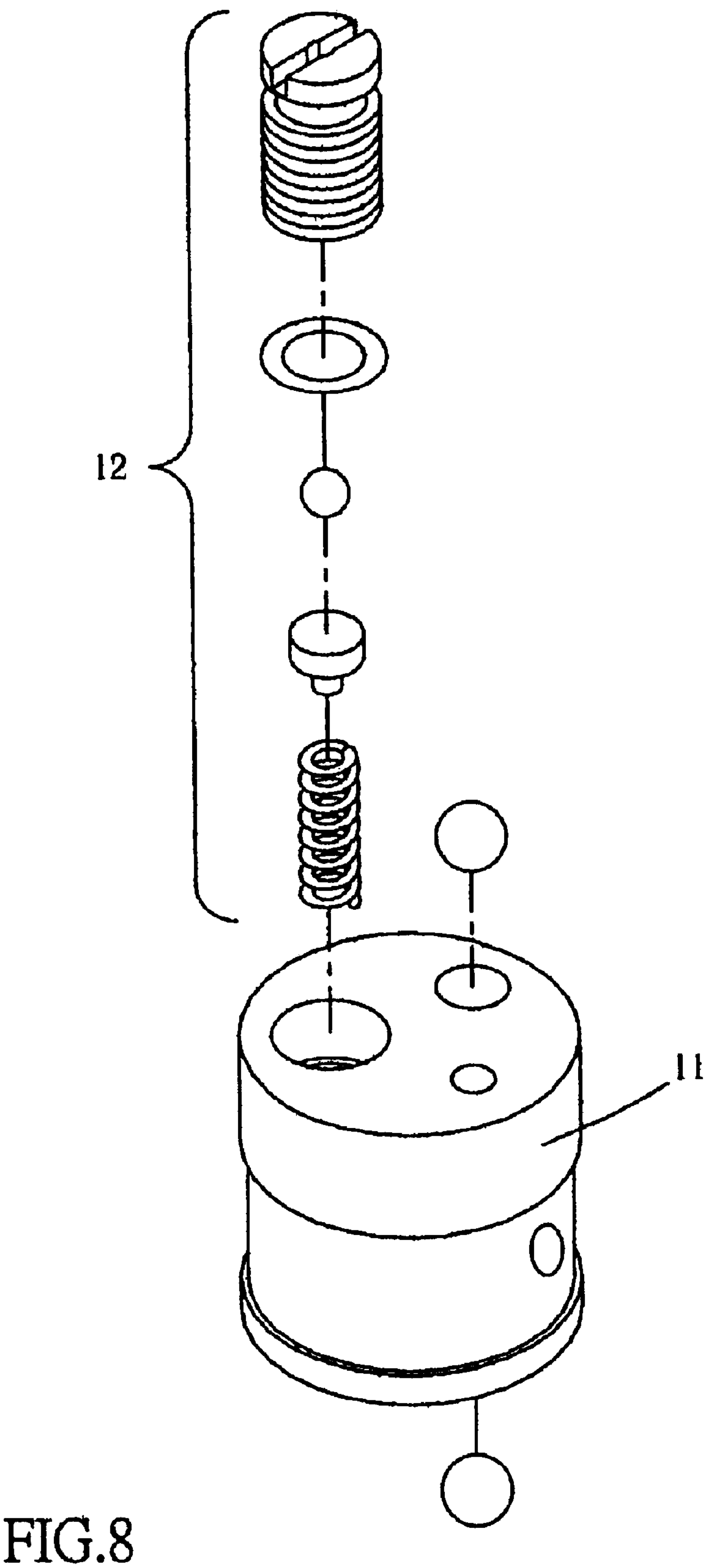
FIG. 8 is an exploded perspective view of the hydraulic puller as shown in FIG. 1.
Figure 9:
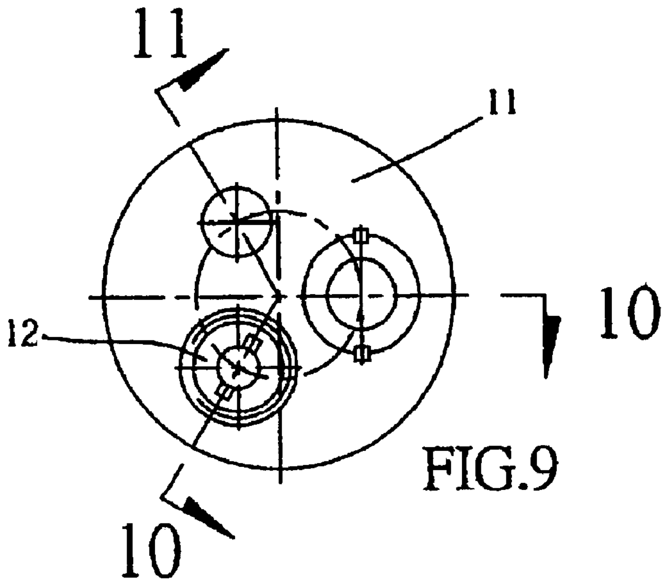
FIG. 9 is a top plan view of an oil supply check valve of the hydraulic puller as shown in FIG. 1.
Figure 10:
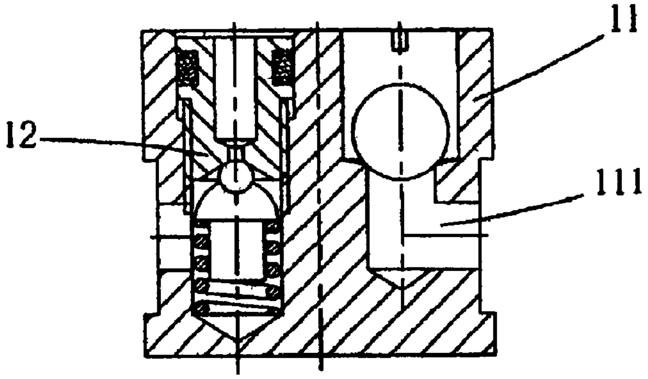
FIG. 10 is a plan cross-sectional view of the oil supply check valve of the hydraulic puller taken along arrows indicated by the mark 10—10 as shown in FIG. 9.
Figure 11:
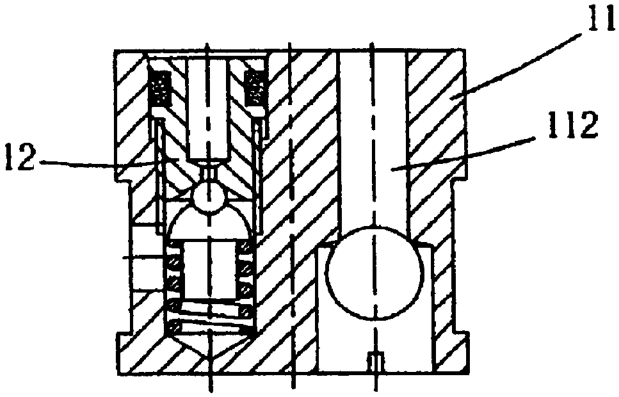
FIG. 11 is a plan cross-sectional view of the oil supply check valve of the hydraulic puller taken along arrows indicated by the mark 10–11 as shown in FIG. 9.

As shown in FIGS. 8, 10 and 11, the high pressure check valve 12 is mounted in the oil supply check valve 11 to prevent the oil contained in the pump 3 from reversely flowing into the oil chamber 41 of the oil tank 4.

Figure 6:
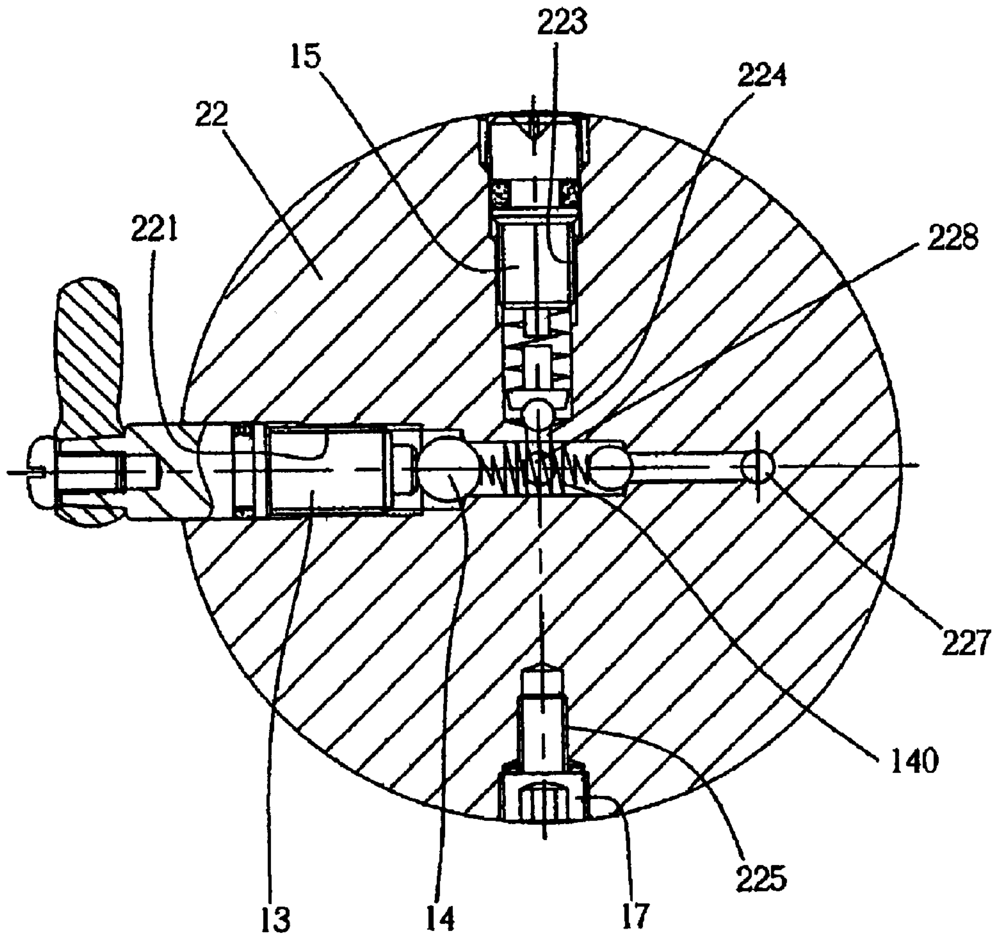
FIG. 6 is a cross-sectional view of the hydraulic puller taken along line 6—6 as shown in FIG. 3.

As shown in FIGS. 3, 5 and 6, the oil return switch 13 is mounted in a first receiving hole 221 of the upper section 22 of the hydraulic cylinder 2. The first receiving hole 221 of the upper section 22 of the hydraulic cylinder 2 has a mediate portion communicating with an oblique hole 222 which is formed in the top of the hydraulic cylinder 2 and is connected to the oil chamber 41 of the oil tank 4.

The check valve 14 is mounted in the first receiving hole 221 of the upper section 22 of the hydraulic cylinder 2 and is rested on the oil return switch 13 to stop connection between the first-receiving hole 221 of the upper section 22 of the hydraulic cylinder 2 and the central hole 228 of the upper section 22 of the hydraulic cylinder 2.

The pressure switch valve 15 is mounted in a second receiving hole 223 of the upper section 22 of the hydraulic cylinder 2. The second receiving hole 223 of the upper section 22 of the hydraulic cylinder 2 has a mediate portion communicating with a lower guide hole 224 (see FIG. 12) which is formed in a bottom of the upper section 22 of the hydraulic cylinder 2 and is connected to the oil chamber 20 of the hydraulic cylinder 2. Preferably, the second receiving hole 223 of the upper section 22 of the hydraulic cylinder 2 is vertical to the lower guide hole 224.

The quick oil supply valve 16 is screwed in a screw bore 229 of the top of the hydraulic cylinder 2 to seal a through hole 227 which is formed in the upper section 22 of the hydraulic cylinder 2. As shown in FIG. 3, the through hole 227 of the hydraulic cylinder 2 has an upper end sealed by the quick oil supply valve 16, a mediate portion communicating with the first receiving hole 221 of the upper section 22 of the hydraulic cylinder 2 and a lower end connected to the oil chamber 20 of the hydraulic cylinder 2.

Figure 12:
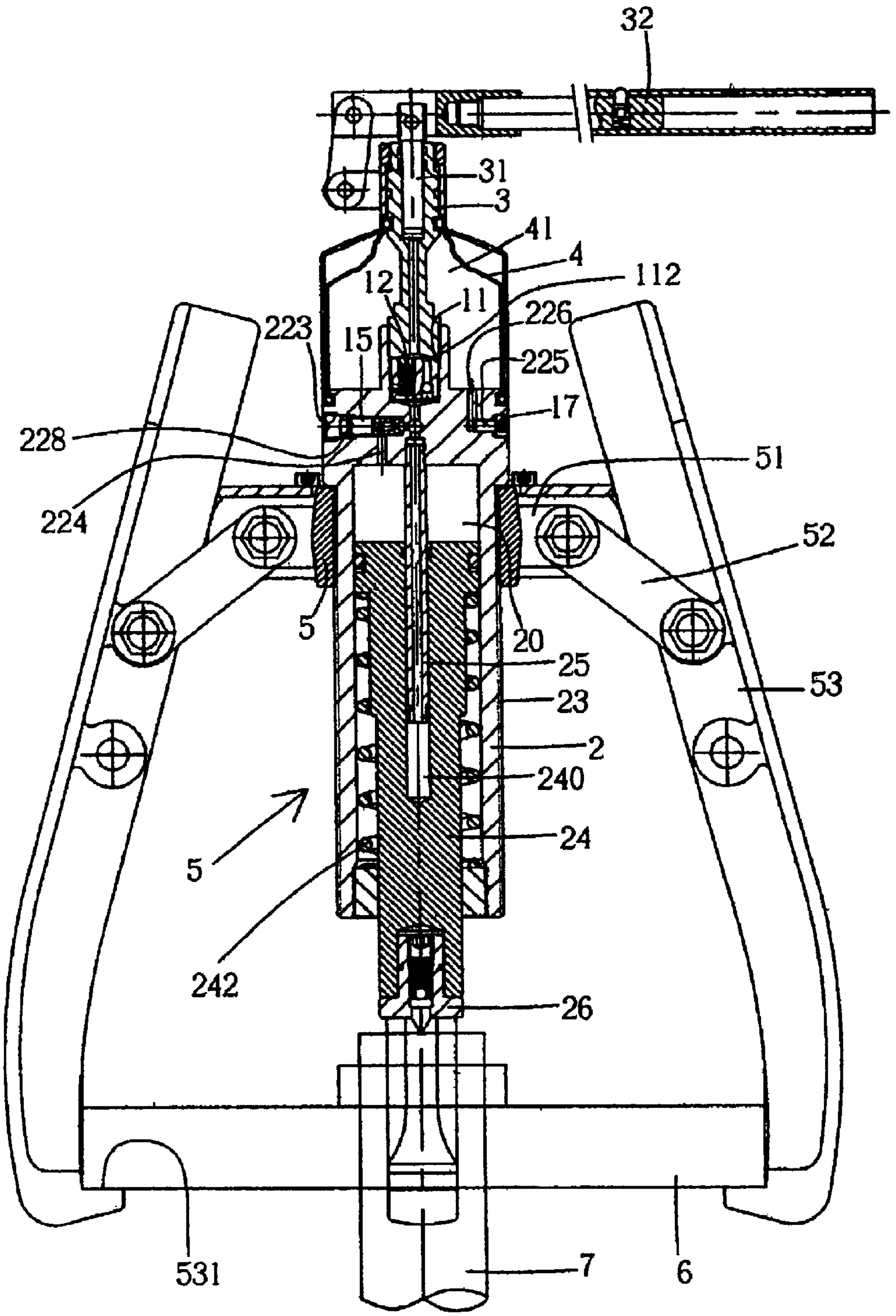
FIG. 12 is a schematic operational view of the hydraulic puller as shown in FIG. 3.
Figure 13:
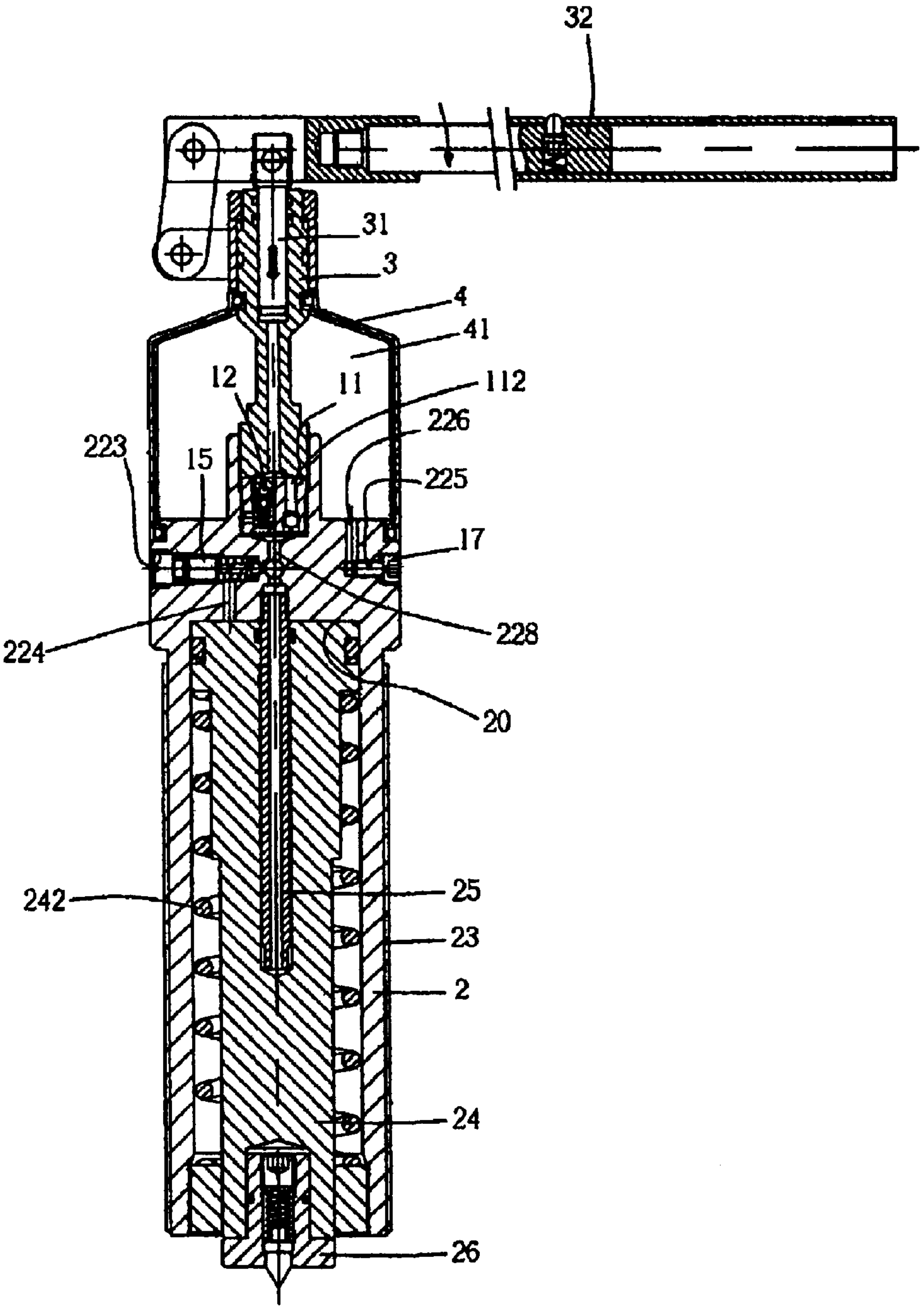
FIG. 13 is a partially plan cross-sectional view of the hydraulic puller as shown in FIG. 1.

As shown in FIGS. 12 and 13, the pressure regulating valve 17 is mounted in a third receiving hole 225 of the upper section 22 of the hydraulic cylinder 2. The third receiving hole 225 of the upper section 22 of the hydraulic cylinder 2 has a distal end communicating with an upper guide hole 226 which is formed in the top of the upper section 22 of the hydraulic cylinder 2 and is connected to the oil chamber 41 of the oil tank 4. Preferably, the third receiving hole 225 of the upper section 22 of the hydraulic cylinder 2 is vertical to the upper guide hole 226.

Figure 14:
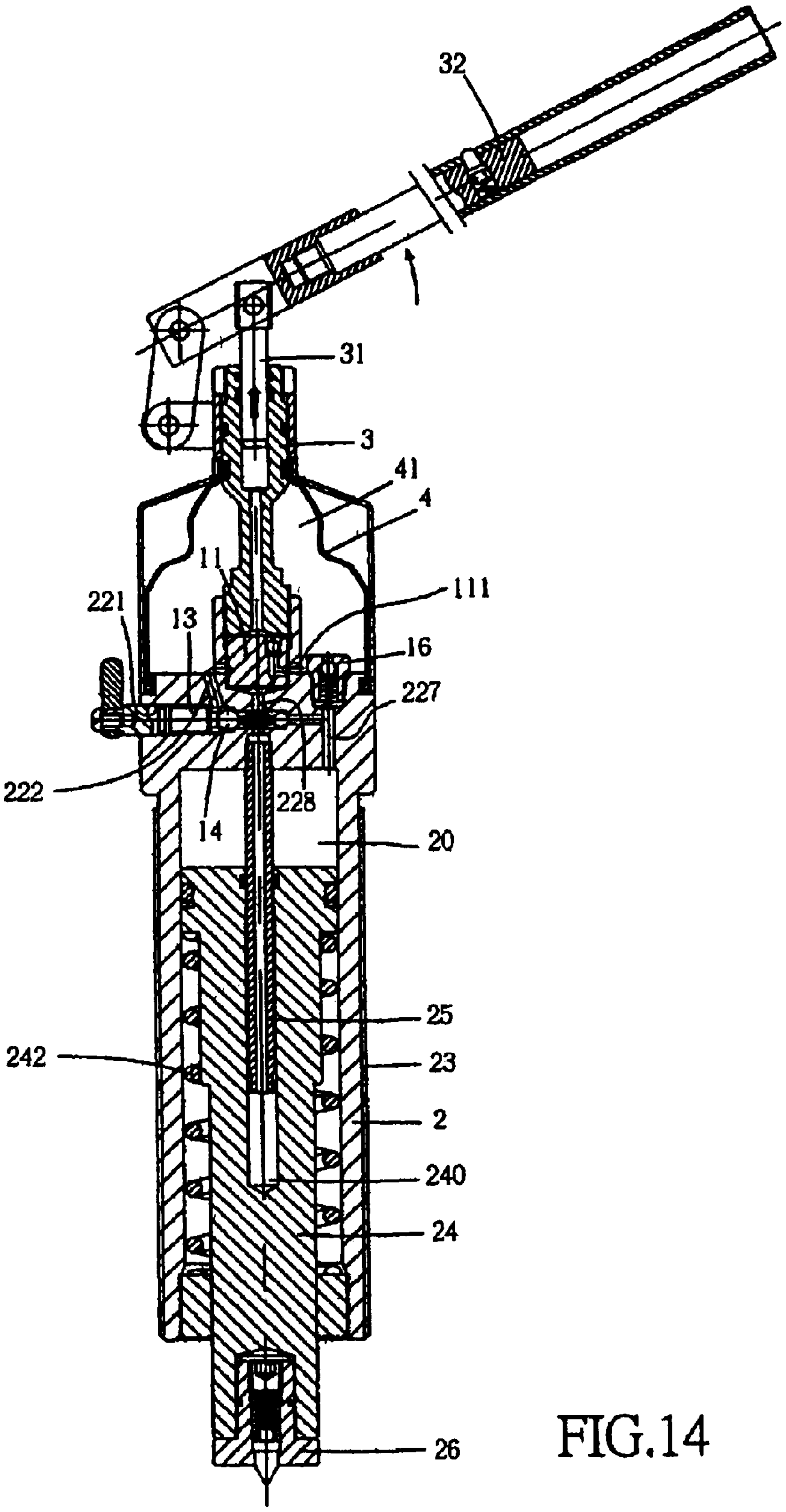
FIG. 14 is a schematic operational view of the hydraulic puller as shown in FIG. 13.

In operation, referring to FIGS. 12–14 with reference to FIGS. 1–11, the claws 53 of the clamping device 5 are mounted on a wheel rim 6, with the hook 531 of each of the claws 53 of the clamping device 5 being rested on a bottom of the wheel rim 6 as shown in FIG. 12. At this time, the operation plate 55 can be rotated by the user's hand to rotate and lift the clamping device 5 so as to control operation of each of the claws 53.

When the piston 31 of the pump 3 is moved upward by the operation handle 32 of the pump 3 as shown in FIG. 14, the oil contained in the oil chamber 41 of the oil tank 4 flows through the oil inlet 111 (see FIG. 10) of the oil supply check valve 11 into the inside of the pump 3.

When the piston 31 of the pump 3 is moved downward by the operation handle 32 of the pump 3 as shown in FIG. 13, the oil contained in the inside of the pump 3 flows through the oil outlet 112 (see FIG. 11) of the oil supply check valve 11 and the central hole 228 of the upper section 22 of the hydraulic cylinder 2 into the oil chamber 20 of the hydraulic cylinder 2 to push the operation shaft 24 and the urging unit 26 downward as shown in FIG. 12, so that the urging unit 26 is pushed downward to press the wheel axle 7, thereby detaching the wheel rim 6 from the wheel axle 7.

In addition, during movement of the piston 31 of the pump 3, the high pressure check valve 12 mounted in the oil supply check valve 11 can prevent the oil contained in the pump 3 from reversely flowing into the oil chamber 41 of the oil tank 4.

After the wheel rim 6 is detached from the wheel axle 7, the oil return switch 13 is rotated to release the check valve 14 which is moved by a spring 140 (see FIG. 6) to detach from the first receiving hole 221 of the upper section 22 of the hydraulic cylinder 2, so that the first receiving hole 221 of the upper section 22 of the hydraulic cylinder 2 is connected to the central hole 228 of the upper section 22 of the hydraulic cylinder 2. At this time, the first receiving hole 221 of the upper section 22 of the hydraulic cylinder 2 communicates with the oblique hole 222 which is connected to the oil chamber 41 of the oil tank 4, so that the central hole 228 of the upper section 22 of the hydraulic cylinder 2 is connected to the oil chamber 41 of the oil tank 4.

Then, the operation shaft 24 is pressed by the restoring force of the spring 242 to move toward the hydraulic cylinder 2 to compress the oil contained in the oil chamber 20 of the hydraulic cylinder 2, so that the oil contained in the oil chamber 20 of the hydraulic cylinder 2 is introduced through the oil chamber 240 of the operation shaft 24, the oil guide tube 25, the central hole 228 of the upper section 22 of the hydraulic cylinder 2, the first receiving hole 221 of the upper section 22 of the hydraulic cylinder 2 and the oblique hole 222 of the hydraulic cylinder 2 into the oil chamber 41 of the oil tank 4. Thus, the oil contained in the oil chamber 20 of the hydraulic cylinder 2 completely flows back into the oil chamber 41 of the oil tank 4.

Accordingly, the operation shaft 24 and the urging unit 26 are moved to press the wheel axle 7 rapidly by control of the oil control device 1, so that the hydraulic puller can be used to clamp the wheel rim 6 and the wheel axle 7 easily and rapidly, thereby facilitating the user detaching the wheel rim 6 from the wheel axle 7. In addition, the operation handle 32 of the pump 3 has an adjustable length, so as to fit users of different statures, thereby enhancing the versatility of the hydraulic puller. Further, the operation plate 55 can be rotated by the user's hand to rotate and lift the clamping device 5 so as to control operation of each of the claws 53, thereby facilitating the user operating the hydraulic puller. Further, the oil control device 1 is built in the inside of the hydraulic puller, thereby preventing the user from misadjusting the oil path so as to protect the hydraulic puller.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A hydraulic puller, comprising a hydraulic cylinder, a pump, an oil tank, and a clamping device, wherein:

the hydraulic cylinder has a lower section formed with an outer thread;

the clamping device includes:

a support seat mounted on the hydraulic cylinder and formed with an inner thread screwed on the outer thread of the hydraulic cylinder;

a plurality of pivot plates each mounted on an outer wall of the support seat;

a plurality of connecting plates each having a first end pivotally mounted on a respective one of the pivot plates;

a plurality of claws each having a mediate portion pivotally mounted on a second end of a respective one of the connecting plates and each having a distal end formed with a hook; and an operation plate secured on the support seat.

2. The hydraulic puller in accordance with claim 1, wherein each of the pivot plates is formed with a screw bore, the operation plate is formed with a plurality of arc-shaped slots, and the clamping device further includes a plurality of screw members each extended through a respective one of the arc-shaped slots of the operation plate and each screwed into the screw bore of a respective one of the pivot plates, so that the operation plate is secured on the support seat.

3. The hydraulic puller in accordance with claim 2, wherein the operation plate has a periphery formed with a plurality of hook-shaped cutouts to facilitate the user operating the operation plate.

4. The hydraulic puller in accordance with claim 1, wherein the pump is provided with an operation handle having an adjustable length.

5. The hydraulic puller in accordance with claim 1, wherein:

the hydraulic cylinder has an inner wall formed with an oil chamber for receiving an operation shaft and an oil guide tube, the hydraulic cylinder has an upper section formed with a central hole;

the operation shaft is movably mounted in the oil chamber of the hydraulic cylinder and has an upper end formed with an oil chamber and a lower end provided with an urging unit; and the oil guide tube has an upper end mounted in the central hole of the upper section of the hydraulic cylinder and a lower end movably mounted in the oil chamber of the operation shaft.

6. The hydraulic puller in accordance with claim 5, further comprising an oil control device including an oil supply check valve, a high pressure check valve, an oil return switch, a check valve, a pressure switch valve, a quick oil supply valve, and a pressure regulating valve, wherein:

the oil supply check valve is mounted in a protruding ring of a top of the hydraulic cylinder and is mounted on a lower end of the pump, so that when a piston of the pump is moved outward with an operation handle of the pump, the oil supply check valve can introduce oil contained in an oil chamber of the oil tank into the pump;

the high pressure check valve is mounted in the oil supply check valve to prevent the oil contained in the pump from reversely flowing into the oil chamber of the oil tank;

the oil return switch is mounted in a first receiving hole of the upper section of the hydraulic cylinder, the first receiving hole of the upper section of the hydraulic cylinder has a mediate portion communicating with an oblique hole which is connected to the oil chamber of the oil tank;

the check valve is mounted in the first receiving hole of the upper section of the hydraulic cylinder and is rested on the oil return switch;

the pressure switch valve is mounted in a second receiving hole of the upper section of the hydraulic cylinder, the second receiving hole of the upper section of the hydraulic cylinder has a mediate portion communicating with a lower guide hole which is connected to the oil chamber of the hydraulic cylinder;

the quick oil supply valve is screwed in a screw bore of the top of the hydraulic cylinder to seal a through hole of the hydraulic cylinder; and the pressure regulating valve is mounted in a third receiving hole of the upper section of the hydraulic cylinder, the third receiving hole of the upper section of the hydraulic cylinder has a distal end communicating with an upper guide hole which is connected to the oil chamber of the oil tank.

7. The hydraulic puller in accordance with claim 6, wherein the oil supply check valve has an oil inlet communicating with the oil chamber of the oil tank, and an oil outlet communicating with the oil chamber of the hydraulic cylinder through the central hole of the upper section of the hydraulic cylinder.

8. The hydraulic puller in accordance with claim 6, wherein the check valve is used to stop connection between the first receiving hole of the upper section of the hydraulic cylinder and the central hole of the upper section of the hydraulic cylinder.

9. The hydraulic puller in accordance with claim 6, wherein the pump is mounted in the oil tank, and the oil tank is mounted on the upper section of the hydraulic cylinder.

10. The hydraulic puller in accordance with claim 6, wherein the oblique hole is formed in the top of the hydraulic cylinder.

11. The hydraulic puller in accordance with claim 6, wherein the lower guide hole is formed in a bottom of the upper section of the hydraulic cylinder.

12. The hydraulic puller in accordance with claim 6, wherein the second receiving hole of the upper section of the hydraulic cylinder is vertical to the lower guide hole.

13. The hydraulic puller in accordance with claim 6, wherein the through hole formed in the upper section of the hydraulic cylinder.

14. The hydraulic puller in accordance with claim 6, wherein the through hole of the hydraulic cylinder has an upper end sealed by the quick oil supply valve, a mediate portion communicating with the first receiving hole of the upper section of the hydraulic cylinder and a lower end connected to the oil chamber of the hydraulic cylinder.

15. The hydraulic puller in accordance with claim 6, wherein the upper guide hole is formed in the top of the upper section of the hydraulic cylinder.

16. The hydraulic puller in accordance with claim 6, wherein the third receiving hole of the upper section of the hydraulic cylinder is vertical to the upper guide hole.

17. The hydraulic puller in accordance with claim 6, wherein when the oil return switch is rotated to release the check valve, the check valve is moved by a spring to detach from the first receiving hole of the upper section of the hydraulic cylinder, so that the first receiving hole of the upper section of the hydraulic cylinder is connected to the central hole of the upper section of the hydraulic cylinder.

18. The hydraulic puller in accordance with claim 17, wherein the first receiving hole of the upper section of the hydraulic cylinder communicates with the oblique hole which is connected to the oil chamber of the oil tank, so that the central hole of the upper section of the hydraulic cylinder is connected to the oil chamber of the oil tank.

19. The hydraulic puller in accordance with claim 1, further comprising a spring mounted on the operation shaft and has a first end secured on a top of the operation shaft and a second end secured on a bottom of the hydraulic cylinder.

* * * * *